A. J. CURTIS.
FRUIT SLICER.
APPLICATION FILED MAR. 9, 1908.

922,266.

Patented May 18, 1909.
2 SHEETS—SHEET 1.

Witnesses
R. C. Claflen
V. E. Burner

Inventor
Andrew J. Curtis
By Edson Bro's, Attorneys

A. J. CURTIS.
FRUIT SLICER.
APPLICATION FILED MAR. 9, 1908.
922,266.
Patented May 18, 1909.
2 SHEETS—SHEET 2.
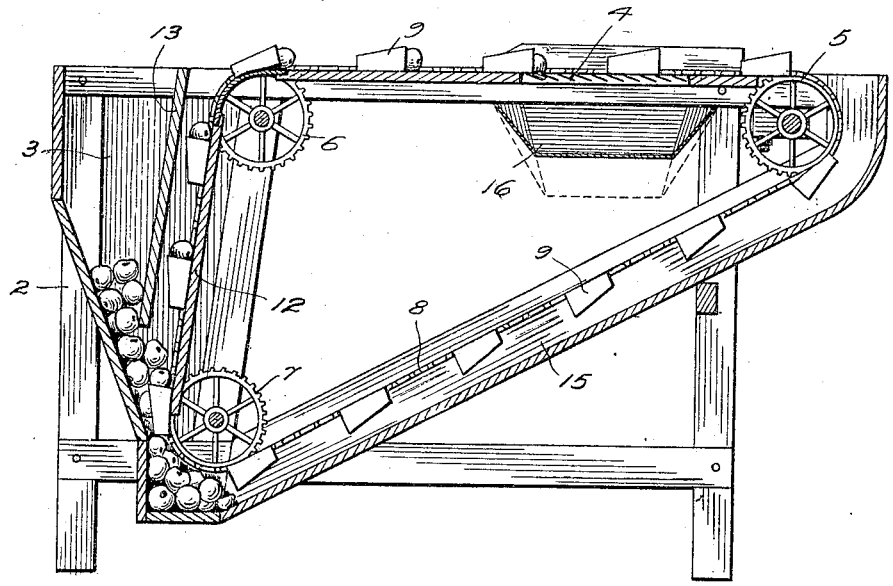
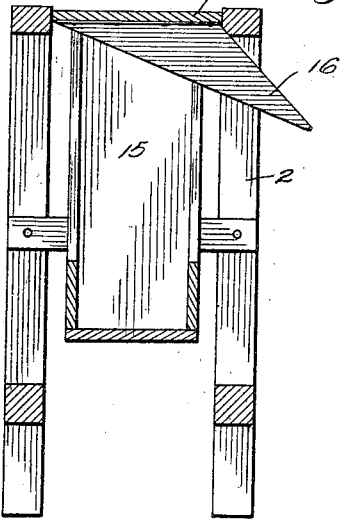
Witnesses
R. C. Claflin
V. E. Burner
Inventor
Andrew J. Curtis
By Edson Bro's, Attorneys

UNITED STATES PATENT OFFICE.

ANDREW J. CURTIS, OF EAST WILLIAMSON, NEW YORK.

FRUIT-SLICER.

No. 922,266.          Specification of Letters Patent.          Patented May 18, 1909.

Application filed March 9, 1908. Serial No. 420,085.

*To all whom it may concern:*

Be it known that I, ANDREW J. CURTIS, a citizen of the United States, residing at East Williamson, in the county of Wayne and State of New York, have invented certain new and useful Improvements in Fruit-Slicers; and I do hereby declare the following to be a full, clear, and exact description of the invention, such as will enable others skilled in the art to which it appertains to make and use the same.

My invention relates to fruit slicers particularly adapted for slicing apples.

It has for its object to provide a machine of this nature which is simple in construction, comparatively cheap of manufacture, self-feeding, and which operates with more satisfactory results than those now in use.

The invention contemplates the employment of means for conveying the apples from a hopper or receptacle and carrying them against the slicing knives in one continuous operation.

The invention also consists in providing means for returning to the hopper any apples which are not sliced when passed across the knives.

The invention further consists in the features of construction and combinations of parts hereinafter described and specified in the claims.

Figure 1:
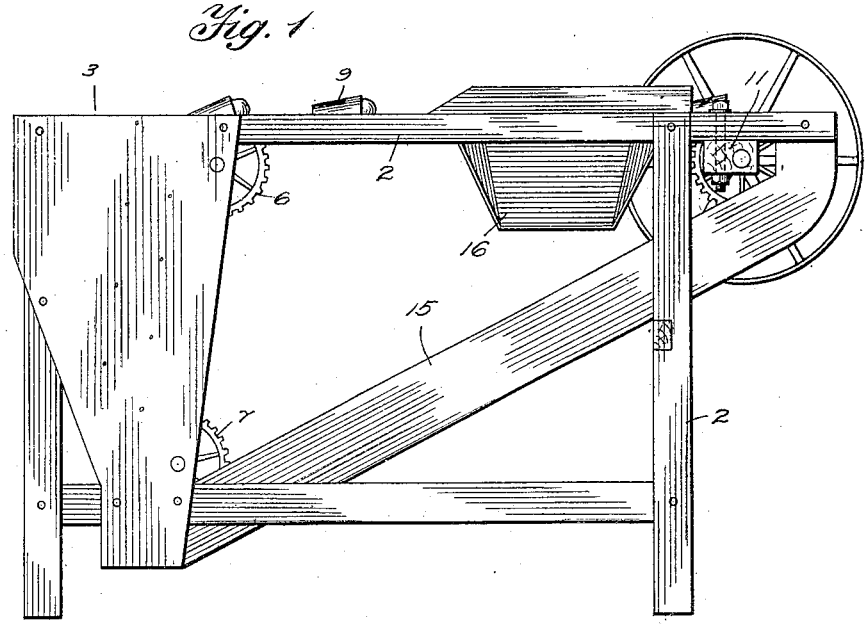
Figure 2:
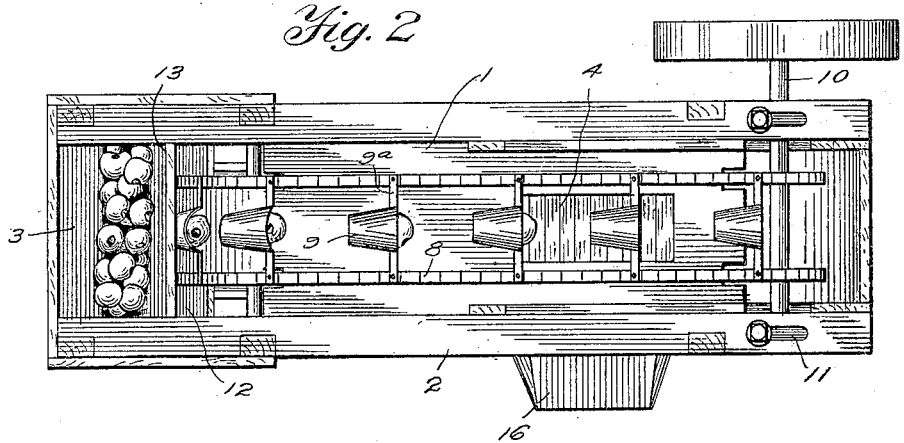

In the accompanying drawings, illustrating the preferred embodiment of my invention: Figure 1 is a side elevation of the slicer. Fig. 2 is a plan view thereof. Fig. 3 is a longitudinal vertical section. Fig. 4 is a vertical cross section, and Fig. 5 is a detail view of one of the apple carriers or pushers.

Referring more particularly to the drawings, 1 designates the work table which is supported upon a frame 2. A hopper 3 is arranged at one end of the frame below the level of the table. A series of knives 4 are arranged in a slot in the table. Said knives are spaced apart and arranged obliquely to the plane of the table with their cutting edges extending up near to the surface thereof and in the direction of the end of the frame at which the hopper is located. Pairs of sprocket wheels 5 and 6 are arranged at the opposite ends of the table and a third pair 7 is arranged near the bottom of the hopper. On these sprocket wheels is mounted an endless carrier comprising two endless chains 8 connected by cups or pushers 9, which are secured between them at intervals. Said carrier is driven in any suitable manner by hand or power. In the drawings I have shown a drive pulley mounted on an extension of the shaft 10 carrying the sprocket wheels 5. The journal blocks 11 of said shaft are adjustable to take up, the slack in the carrier.

The inner wall or back 12 of the hopper extends from the lower pair of sprocket wheels 7 up to the table which it joins near where the sprocket wheels 6 are mounted. The endless carrier therefore passes up from the sprocket wheels 7 to the sprocket wheels 6 interiorly of said back or wall 12 and in close proximity thereto. A false back 13 is arranged in the hopper to prevent the bulk of the apples from coming in contact with the carrier. A space is left below the lower end of the false back to permit of the passage of the apples to said carrier at the point where it passes around the sprocket wheels 7.

Each of the cups or pushers 9 is preferably semi-circular in cross section and has a lug 9ª at each side of its flat face for securing said cup to the sprocket chains. The forward end of each cup has an extending flange 9ᵇ around its curved edge to retain an apple in position but there is no flange across the flat edge of said end that edge being cut away to permit the apples to come in contact with the knives. It will be understood that the flat faces of the cups are presented to the plane of the chains while their rounded faces project outwardly therefrom. The size of each cup is such that it will only hold one apple which it takes up from the hopper as it travels from the sprocket wheels 7 to the sprocket wheels 6. The back or wall 12 of the hopper along which said cups pass holds the apples in position in the cups within the flanges thereof.

A chute or trough 15 is arranged below the carrier between the sprocket wheels 5 and 7. Any apples which roll over the knives without being sliced are returned to the hopper by this trough. A suitable receptacle or spout 16 is arranged below the slot in the table in which the knives are mounted and is adapted to receive the slices of apples as they are cut and passed down between the knives.

Before apples are placed in my machine they should preferably be pared and cored on a suitable machine. They should also be trimmed by slightly flattening them on the stem end. Apples thus prepared being placed in the hopper of my machine are taken up by the cups on the endless carrier and conveyed to the table as already described. When the apples reach the table they right themselves upon their trimmed or flattened ends and are pushed in that position over the knives. The result is that each slice is cut square across the hole formed by coring the apple. There are enough of the knives to slice the entire apple into slices of any desired thickness. If any apple does not right itself properly on the table and rolls over the knives without being sliced the cups or pushers will return it to the hopper by way of the trough 15.

I claim:

1. In a machine of the character described, a table, knives arranged on said table, a hopper with its back extending up to the top of the table, guide wheels arranged at each end of said table and at the bottom of said hopper, and an endless carrier mounted on said wheels and passing through said hopper, said carrier having cups secured at intervals thereto, said cups being adapted to hold the contents thereof against the back of said hopper and against the top of the table as they are moved along.

2. In a machine of the character described, a table, knives arranged on said table, a hopper with its back extending up to the top of the table, guide wheels arranged at each end of said table and at the bottom of said hopper, and an endless carrier mounted on said wheels and passing through said hopper, said carrier having cups secured at intervals thereto, said cups being adapted to hold the contents thereof against the back of said hopper and against the top of the table as they are moved along, and a false back in said hopper for the purpose specified.

3. In a machine of the character described, a table, knives arranged on said table, a hopper with its back extending up to the top of the table, guide wheels arranged at each end of said table and at the bottom of said hopper, and an endless carrier mounted on said wheels and passing through said hopper, said carrier having cups secured at intervals thereto, said cups being adapted to hold the contents thereof against the back of said hopper and against the top of the table as they are moved along, and adjustable journals for the guide wheels at one end of the table for the purpose of taking up slack in the carrier.

4. In a machine of the character described, a table, knives arranged on said table, a hopper with its back extending up to the top of the table, guide wheels arranged at each end of said table and at the bottom of said hopper, and an endless carrier mounted on said wheels and passing through said hopper, said carrier having cups secured at intervals thereto, said cups being adapted to hold the contents thereof against the back of said hopper and against the top of the table as they are moved along, and a trough arranged below the portion of the carrier which moves toward the hopper for the purpose specified.

5. In a machine of the character described, a table, knives arranged in a slot in said table, a hopper with its back extending up to the top of the table, guide wheels arranged at each end of said table and at the bottom of said hopper, and an endless carrier mounted on said wheels and passing through said hopper, said carrier having cups secured at intervals thereto, said cups being adapted to hold the contents thereof against the back of said hopper and against the top of the table as they are moved along, a trough arranged below the portion of the carrier which moves toward the hopper for the purpose specified, and a receptacle arranged below said knives and between the table and said trough for the purpose specified.

6. In a machine of the character described, a table, knives arranged on said table, a hopper with its back extending up to the top of the table, guide wheels arranged at each end of said table and at the bottom of said hopper, and an endless carrier mounted on said wheels and passing through said hopper, said carrier having cups secured at intervals thereto, each cup being semi-circular in cross section with its flat side presented to the back of said hopper and the top of the table, said cup having a flange around its outer curved edge for the purpose specified.

In testimony whereof, I affix my signature, in presence of two witnesses.

ANDREW J. CURTIS.

Witnesses:
CHARLES H. ROBIE.
G. A. SCULLEN.